United States Patent
Aggarwal et al.

(10) Patent No.: US 10,726,403 B2
(45) Date of Patent: Jul. 28, 2020

(54) CENTRALIZED TOLL TRACKING, PAYMENT AND MONITORING SYSTEM USING GEO LOCATION ENABLED DEVICES

(71) Applicant: Sunil Goel, Gandhinagar (IN)

(72) Inventors: Adityakumar Akshaikumar Aggarwal, Shelby Township, MI (US); Sunil Goel, Gandhinagar (IN)

(73) Assignee: Adityakumar A. Aggarwal, Detroit, MI (US)

( * ) Notice: Subject to any disclaimer, the term of this patent is extended or adjusted under 35 U.S.C. 154(b) by 279 days.

(21) Appl. No.: 14/409,408

(22) PCT Filed: May 15, 2013

(86) PCT No.: PCT/IN2013/000315
§ 371 (c)(1),
(2) Date: Dec. 18, 2014

(87) PCT Pub. No.: WO2013/190566
PCT Pub. Date: Dec. 27, 2013

(65) Prior Publication Data
US 2015/0154578 A1    Jun. 4, 2015

(30) Foreign Application Priority Data
Jun. 22, 2012 (IN) .......... 1811/MUM/2012

(51) Int. Cl.
G06Q 20/14 (2012.01)
G06Q 50/30 (2012.01)
G07B 15/06 (2011.01)

(52) U.S. Cl.
CPC .......... G06Q 20/145 (2013.01); G06Q 50/30 (2013.01); G07B 15/063 (2013.01)

(58) Field of Classification Search
CPC ..... G06Q 20/145; G06Q 50/30; G07B 15/063
(Continued)

(56) References Cited

U.S. PATENT DOCUMENTS 6,140,941 A * 10/2000 Dwyer ............... G07B 15/063
                                                235/384
8,219,443 B2 * 7/2012 Delia ................ G06Q 30/0207
                                                705/13

(Continued)

FOREIGN PATENT DOCUMENTS

JP    2003203254 A  *  7/2003

OTHER PUBLICATIONS

A novel architecture for multilane-free-flow electronic-toll-collection systems in the millimeter-wave range Published by IEEE Transactions on Intelligent Transportation System (Year: 2005).*

*Primary Examiner* — Jeff Zimmerman
*Assistant Examiner* — Zeina Elchanti

(57) ABSTRACT

The present invention describes the system of centralized toll identification, payment and monitoring, which uses geo-location enabled devices such as mobile phone, pager or wireless connected laptops to do so. The invention receives the series of readings, distributed over the length of the toll road, by Location Based Services (LBS) provided by geo-enabled devices along with geo-location database lookup and statistical algorithms to accurately identify whether the vehicle is travelling on toll road, distance travelled by the vehicle on toll road and accordingly calculate and deduct charge by online mode. Using such system, person can do the payment of toll when passing through toll road area directly from his geo-location enabled devices without any intervention of any attendant and simultaneously police can use the toll data from the centralized toll system for enforcement.

11 Claims, 6 Drawing Sheets

Figure 1:
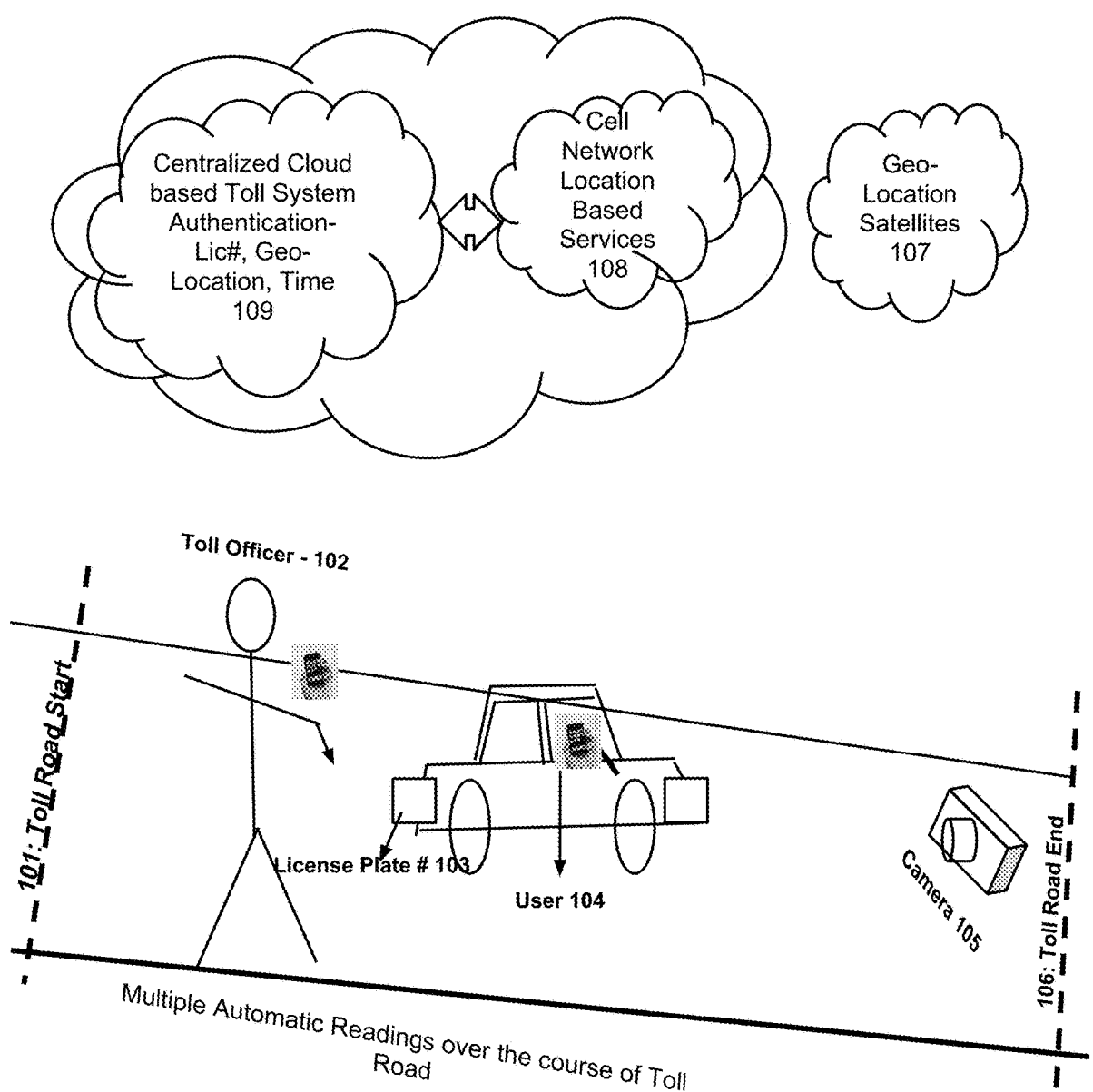

(58) Field of Classification Search
USPC .......................................................... 705/13
See application file for complete search history.

(56) References Cited

U.S. PATENT DOCUMENTS

| | | | |
|---|---|---|---|
| 8,587,454 B1* | 11/2013 | Dearworth | G07B 15/063 |
| | | | 340/5.1 |
| 2006/0054680 A1* | 3/2006 | Feldman | G07B 15/063 |
| | | | 235/375 |
| 2006/0083243 A1* | 4/2006 | Igarashi | H04L 45/42 |
| | | | 370/392 |
| 2012/0215594 A1* | 8/2012 | Gravelle | G07B 15/02 |
| | | | 705/13 |
| 2015/0012309 A1* | 1/2015 | Buchheinn; Timm | ........................ |
| | | | G07B 15/02 |
| | | | 705/5 |

* cited by examiner

CENTRALIZED TOLL TRACKING, PAYMENT AND MONITORING SYSTEM USING GEO LOCATION ENABLED DEVICES

FIELD OF INVENTION

This invention describes the system of centralized toll identification, payment and monitoring, which uses geo-location enabled devices to do so.

The invention used the series of readings distributed over the length of the toll road by Location Based Services (LBS) provided by Geo-Enabled Mobile (GEM) devices such as phone, pager or wireless connected laptops and others along with reverse geo-location database lookup and statistical algorithms to accurately identify if the vehicle is travelling on toll road. This approach of looking holistically at the travel on the toll road with multiple readings is very different from the current systems designs that are based on just taking readings at starting of the toll road and sometimes reading at exit toll for a long turnpike toll road.

Because of this information new toll rate programs can also be designed where charge can dependent on duration of time vehicle spends on the toll road.

Combination of series of reading of the vehicle travelling and comparing is statistically with the database of geo-location of toll roads overcomes the inherent inaccuracy of system based on LBS reading from one location. Due to inherent inaccuracy in single geo-location reading, till now no large scale toll system has been designed entirely using LBS. Using such system customer (also referred as user, or vehicle driver or driver or toll payer) can do the payment of toll when passing through toll road area directly from his Geo-Enabled Mobile (GEM) devices such as smart phone without any intervention of any toll booth attendant and simultaneously police (also can be referred as toll enforcement officer) or toll both person (also can be referred as toll collector) can also monitor the centralized toll payment done or not by the particular person using such kind of system.

There are significant advantages of this system (1) Vehicles don't have to slow down to pass through the toll booth thereby saving in gas, vehicle wear-tear and time; (2) Reduces the cost of building expensive toll booths and their operating costs; (3) Provides a mechanism to put a toll on part of road/bridge for new construction or renovation and dismantle it once the money to build the road/bridge is recovered; (4) Travellers don't have to fumble to find coins or receipt; (5) New rate plans based on time of day and duration can be developed which encourages use of toll roads more efficiently.

BACKGROUND OF INVENTION

This invention tracks the vehicle traveling on the toll road by multiple reading and automatically charges customer without needing their intervention. That is very different than the current solution used where there are one or two checkpoints to identify vehicle going on a toll road.

As the cost of building and operating of a toll booth is high, tendency is to do with one toll booth unless the toll is very long. This leads drivers to pay more tolls for the road they are not using.

This invention relates to the problem of toll payment, when a user is passing through toll road using vehicle and has to wait for collection of toll ticket manually and give the appropriate payment manually. In order to reduce the time and labor of a user and a toll collector, the present invention deals with the use of geo location enabled devices like smart phone, laptop, palmtop etc. to do the toll road payment electronically using said devices.

So far some of the inventions which try to resolve the same problem by using different means includes as per below:

DE 102004035985 A1 discloses the method involves locating a mobile radio station (3) in the motor vehicle with at least one master station (2) of the portable radio net suitable for locating mobile radio stations. As soon as the mobile radio station is in range (5) of an approach (6) or exit (7) of the road system a data record associated with the mobile radio is compared with entries in a computer of the mobile station or connected to the portable radio net. Corresponding data records of mobile radio stations assigned to motor vehicles are stored in the data base. As soon as the data record is found a charge counter assigned to the mobile radio station and/or the motor vehicle is started or continued with automatic logging of an identification code of the approach or exit. A traveled distance, bridged distance and/or utilization period is determined by evaluating as user approaches and exits. A fee is computed depending on the distance and/or utilization period.

JP2001243513 (A) describes the method and device for automatic payment of toll highway fare using cellular phone. The use of this device includes a cellular phone which is prepared in a vehicle and registers the information specifying a telephone set and the settlement method of toll highway fare corresponding to the telephone specification information at the toll highway fare management side, an entrance/exit controller which receives the specification information on the cellular phone and transmits this received information and the entering/leaving points of toll highways to the toll highway fare management side and a controller which is placed at the toll highway fare management side to calculate the toll highway fares of vehicles carrying cellular phones from the specification information and toll highway entering/leaving points information sent from the entrance/exit controller and to charge the toll highway fares to each settlement institution according to the registered settlement method. In such a constitution, the toll highway fare can be automatically paid by means a cellular phone and a base station antenna of the cellular phone and with no use of an IC card nor a private radio unit.

JP2007034645 (A) discloses a mobile station equipment of automated toll-payment system, wherein the mobile station equipment of an automated toll-payment system is provided with a wireless communication means for communicating with a base station installed on a road, an automated toll-payment processing means which executes processing relating to the payment of a toll of a toll road through the wireless communication means, and at least a second application processing means as a means used in uses except the payment of a toll of a toll road. In this case, the mobile station equipment is provided with an application selection means for determining whether the automated toll-payment processing means or the second application processing means is to be operated, and operates not to communicate with a base station ready for an application, to which prohibition is set when an operation-prohibition setting is made by the application selection means.

KR20040066398 (A) provides an invention of GPS mobile telephone system having function of settling toll road, in which a GPS (Global Positioning System) mobile telephone has a function of settling a toll road based on position information. A mobile telephone settling system receives the position information of the GPS mobile telephone. The mobile telephone settling system reads vehicle road information corresponding to the position information of the GPS mobile telephone from a vehicle road database. The mobile telephone settling system reads a corresponding vehicle number from a vehicle number database remembering a GPS mobile telephone number and a vehicle number for demanding payment to the mobile telephone number.

Though all above mentioned inventions describes the use of mobile phone or mobile station equipment like devices to track tolls but either it requires some apparatus to be placed in the vehicle or required camera to get the license plate or entrance and/or exit controllers or similar system on the toll booth. All such type of inventions solves the problem of time consumption and labor done by the user and toll collector by using mobile based system.

But all these prior art did not address the objective of reduction in cost of establishing toll booth collecting system. Also, these systems designed to take readings when vehicle enters the toll booth compared to our solution which looks at complete holistic solution with multiple readings at different times while vehicle is travelling on the toll road—effectively taking readings at different locations.

The difference in the present invention versus the existing solution becomes non-obvious for the use case for example, if vehicle by mistake enters into the toll road and it turns around in few meters. In the existing solutions, the person at toll booth has to reverse the transaction manually and if the person at toll booth cannot do it—then vehicle driver has to pay the toll. While in the present invention, vehicle driver would not be even charged based on the business defined that says that vehicles travelling less than x % on toll road would not be charged. Or if the vehicle returned back within a small distance without crossing to other side, should not be charged.

The present invention deals with providing a system wherein when the user start the application from his geo-location enabled device such as smart phone or laptop or such kind of devices, it sends the message to centralized server, which takes record of the time of vehicle entry on the toll road and determine when it exited from the road and calculate the total charges of toll fees depending on the rate of toll fee prevailing in that geo-location.

Users can do the payment by mobile or net banking or by credit card, which can be recorded in real time by centralized server and acknowledgement of the paid receipt will be sent in real time. This invention requires no special instrument or device to be placed either on the toll road or in the car and hence reduces the cost of installment and maintenance of such devices and also reduce the expenditure on human resources required to monitor the toll road.

OBJECTIVES OF THE INVENTION

The main objective the present invention is to provide a system for centralized/cloud toll road system using existing geo-location enabled devices e.g. smart phones in such a way that accurate identification of vehicle on the toll road is done to help in calculation and payment of toll fees.

Another objective is to provide an effective means to the police or toll collector do spot checks for the vehicles on toll road are paying toll or not.

Another objective is to replace the use of toll booth ticket vending machine and thereby reduce the cost required for new installation and maintenance of thousands of ticket vending machines.

Yet another objective is to provide easy transaction of the payment by the user and reduce the avoidance of collecting money (coins) from each of the toll gate point.

Further objective is to provide convenience to end user to pay for toll without searching for coins and also estimating what is the right amount of toll charge; as different exit points on the toll road correspond to different distances and charges have to be calculated accordingly.

Yet another objective is to provide a database of the vehicles who have paid the toll which could be cross-checked against the video camera to identify the vehicles that have not paid the toll.

Further objective is to provide a system, which do continuous tracking of vehicle in toll road and depending upon the distance travelled do the calculation of toll charges.

Yet another objective is to provide a system, wherein if vehicle unintentionally goes inside the toll road and before crossing certain fixed limit, would like to return back, then no charges deducted in this case.

BRIEF DESCRIPTION OF THE INVENTION

Figure 2:
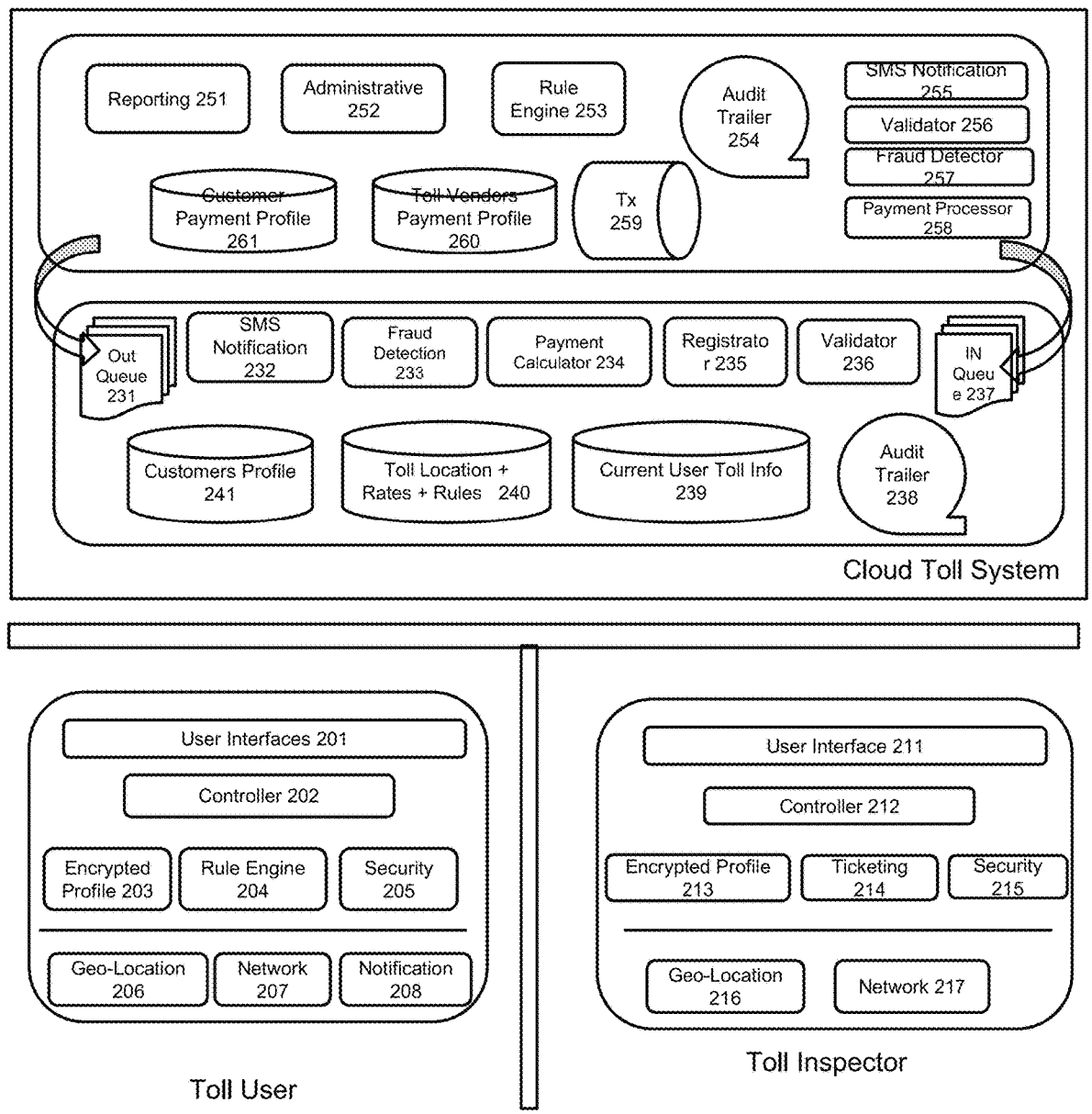
Figure 3:
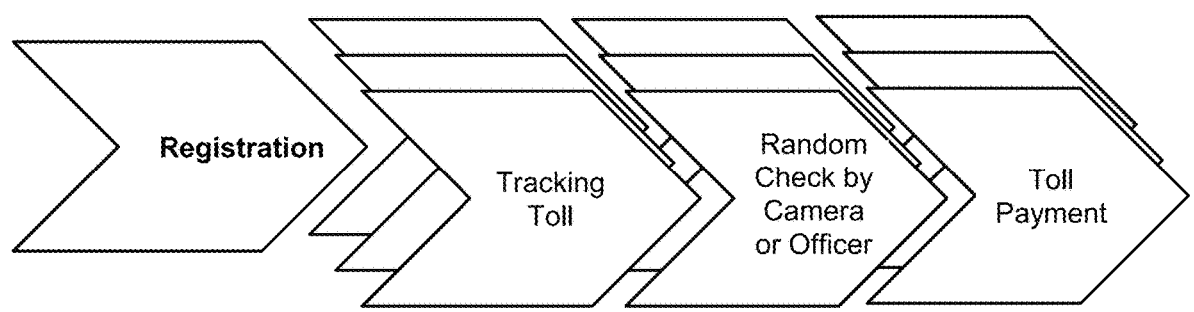

The present invention provides a cloud based Toll tracking system using geo-location enabled devices.
Working of the System:

With the above and other objects in view which will become apparent from the following details, description some preferred forms of the invention are shown in the drawings in which FIG. 1 represents the contextual diagram of the present invented system FIG. 2 represents the block diagram of the present invented system FIG. 3, 4, 5, 6 represent the flow diagrams of the invented system.

Also, the design can be enhanced to use Optical Corrector Recognition (OCR) in backend to decrypt the photo of the vehicle number plate. To avoid expense of image file of the number plate to be uploaded, barcode can be used where customers who enroll in the program get a free barcode for each vehicle they have registered. Also, the location of the vehicle is verified by knowing the location of the Toll enforcement Officer's Geo-location Enabled Mobile (GEM) device.

DETAILED DESCRIPTION OF OPERATION

There are five major components as shown in FIG. 1—(a) Toll Tracking App one-location Enabled Mobile (GEM) device—104 owned by the user driving the vehicle (b) Toll Enforcement app on GEM—102 used by the Toll officer and (c) Cloud based central Toll system—109 to keep track of vehicles on toll road and provide virtual Toll receipts and for performing toll payment transactions. (d) Cell network which includes Location Based Services (LBS)—108. (e) License Plate Camera 105

The statistical algorithm is used to identify if the vehicle is travelling on the Toll Road. FIG. 1 shows the contextual diagram of the operation where person—104 drives the vehicle through a Toll road—101 through 106 and uses their geo-location aware wireless mobile to inform the cloud Toll system—109 about the location so it creates virtual Toll receipt. The location is provided by the GPS in the device or Location based service available in the cloud provided by carrier network.

There can be various toll plans such as all day/week/month pre-paid pass, or pay at end of every travelling on Toll road. The different Toll plans are not limited to what is described but can support multiple plans and their combination as complex rules can be built in the rule engine.

Toll enforcement officer (can be called police or Toll officer)—102 uses the enforcement app on the GEM as shown in FIG. 1. Toll enforcement Office is standing on the side of the road and uses enforcement app on the geo-location enabled device. This application identify the vehicles passing in front to the enforcement officer.

If the vehicle passes in front of enforcement officer that is not identified by the cloud Toll system, has not paid the Toll.

Camera—105—can be used to check the Vehicle License Plate #103 to check the virtual Toll receipt in the centralize cloud.

This proposed solution doesn't need complex system or sensors or other equipment or any other marking at the Toll locations for system to work thereby reducing the infrastructure implementation and maintenance costs.

The process is described in more detail by the flow charts in FIG. 3, FIG. 4, FIG. 5 and FIG. 6.

Figure 4:
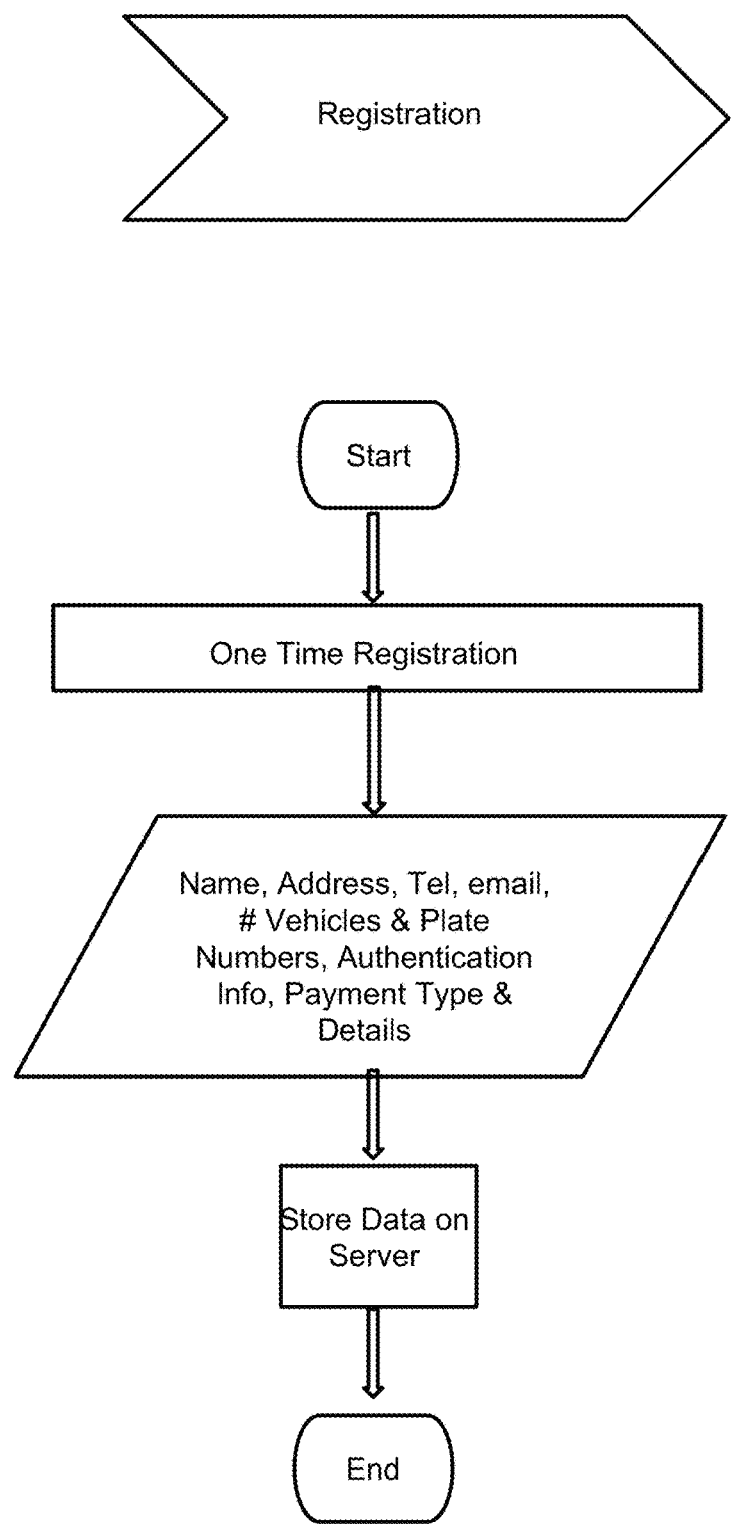

User downloads the App on their device and installs and configures it as one time registration process as shown in FIG. 4 shown under registration chevron by providing Name, Address, vehicle Lic(s) #, Authentication information and method, payment type and other payment details. Registration is one time operation and done using user interface—201 & 202 (FIG. 3).

Alternative can be provided where one time registration can be performed using web application and then mobile app is configured with the user authentication credentials. User can enter multiple vehicle Lic # at one time and also define the default vehicle. Or user can also register by calling on the phone using a live operator or using Interactive Voice Recognition (IVR) and computer telephone interactive (CTI) application or by sending SMS/GPRS message.

The profile of the user is kept on the central server with payment method, vehicle numbers and user address—241. This prevents loss of information if phone is lost or stopped working or system installed on any other devices. The default vehicle can be specified for a particular geo-location device. This functionality enables a use-case where users can share the same Toll account in their family and each family member can have a different default license plate for their vehicle. The basic user profile information is stored in Customer Profile—241 while more financial sensitive information is stored in Customer Payment Profile—261. Customer authentication information can be stored on the device in encrypted form using security library—203.

Figure 5:
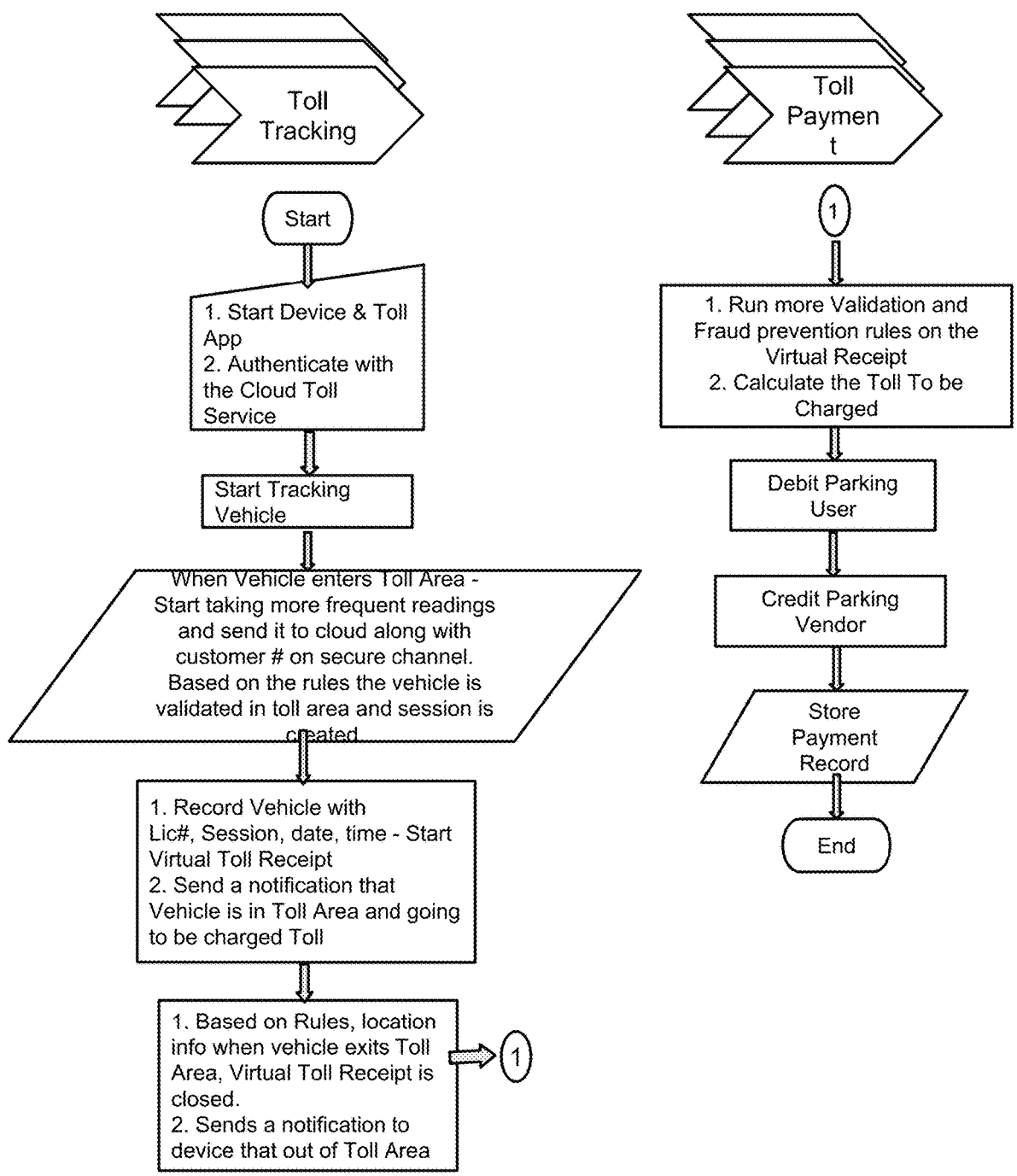

As show in FIG. 5 flowchart, the Toll Tracking app is started in background when the GEM is or started by the manually by user. The only requirement is it needs to be started before going on toll road. It is recommend that it is kept running in background when driving all the time. The driver can override the defaults from the registration of the Toll Tracking app. [0031] Toll Tracking application takes multiple readings by adapting intelligently using the geo-location data. Adaptive Intelligent reading algorithm is based on principle if vehicle is very near or on Toll road then take more geo-location readings. While if vehicle is very far from nearest Toll road then the system will take very few reading. When the vehicle is far from nearest the toll road, the application can get the location information using the wireless tower as it is less power consuming and accuracy is not so important.

The toll tracking process starts once it is confirmed by central cloud based toll tracking system by multiple readings that user is driving the vehicle in the toll road.

The toll tracking app logs into cloud Toll system—106 to get the virtual Toll receipt by providing Geo-location, License Plate #. Identifying of going to Toll Road and issuing of the virtual Toll receipt is done automatically without any intervention of the drive.

Driver is informed of the entry into the Toll area through notification. If geo-location enabled devices that don't have local GPS, they use network based location based services.

If the toll exit point is far off then the Toll Tracking App intelligently reduces the number of readings and sending information to the central cloud based toll system.

Some smart phones augment the accuracy of the GPS by using network based location services.

The process of tracking and paying toll is an automated process once the mobile application is started.

The application has sophisticated algorithm to identify if there are other location-aware devices which are running the same app in the vehicle. To avoid multiple counting, cloud system will send notification to the mobile devices in the vehicle that multiple location-aware devices are running the same application and disable toll payment option for all the devices except one. Also, option can be enabled so that system can automatically identify the toll payment application that are to the ignored and should not be charged for the said segment of journey.

The central cloud system keeps track of the vehicle number, time and travel route on which the toll was charged. In case, phone runs out of battery then vehicle exits through the manual toll booth. The person at toll both can look where the vehicle entered from the information in cloud and can charge driver appropriately.

The payment will be calculated—234 for the toll and credited using set of systems—240, 253, 256, 257 and 259 to the toll authority based on the financial agreement signed. The system calculates the amount of money to be paid. Shows to the user and charges it to his/her credit card or other payment method as specified in the profile and credits that amount to the party owning the toll road subtracting agreed upon service charge. The cloud Toll system completes the toll transaction by debiting the user account by amount equal to the tolls and credits the toll entity's account according the business agreement. There is the fraud prevention system 233 and 257 to reduce the frauds committed. The application will send notification to the user when the vehicle is confirmed to have entered the toll road and also when the vehicle exits the toll road along with the payment amount charged.

Figure 6:
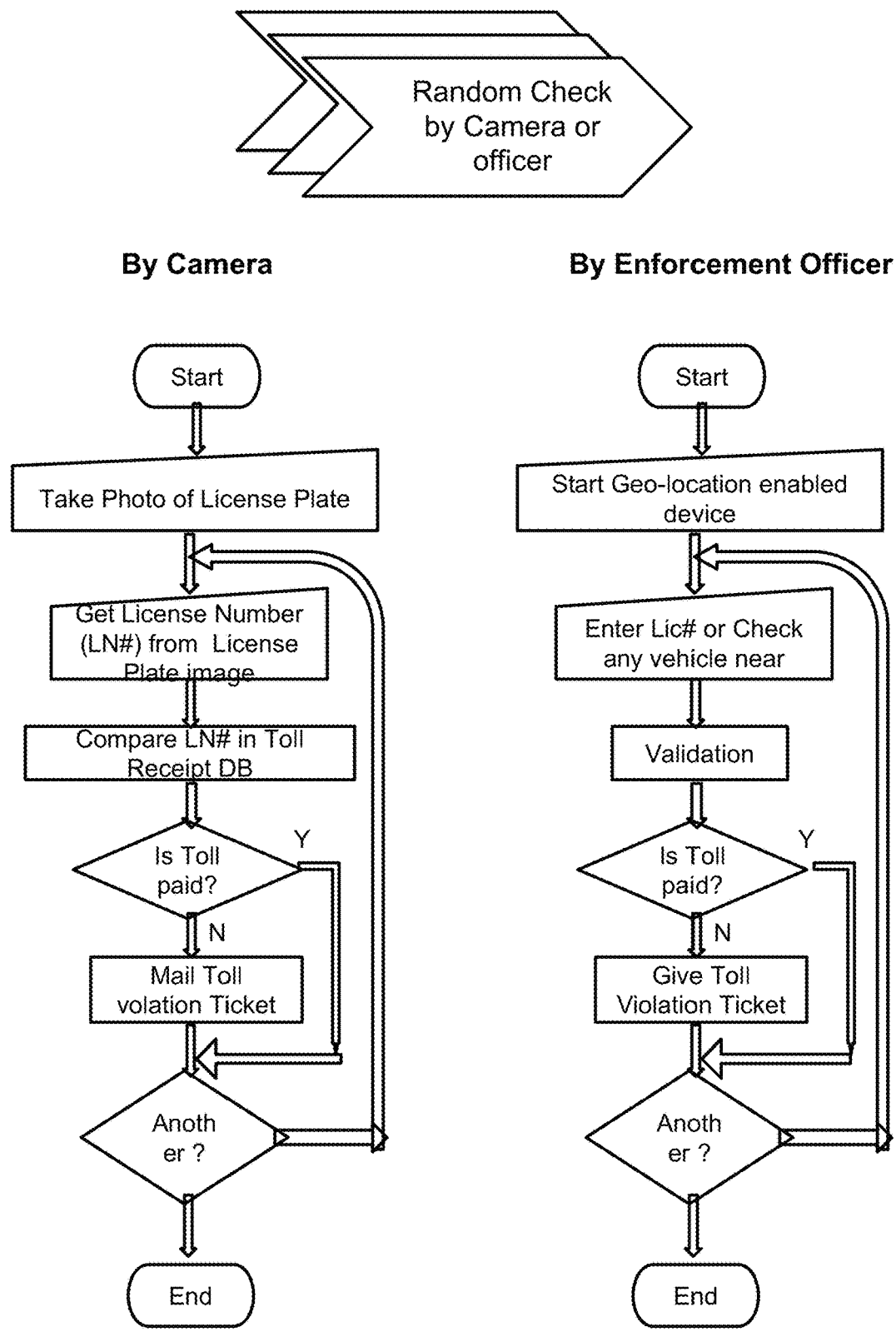

As shown in FIG. 6 flowchart, Toll enforcement officer can check whether the vehicle toll is paid by the vehicle by running the enforcement mobile application on his/her phone using user interface 211 and 212. Also system will calculate based on proximity of the enforcement officer using Geo-Location 216 & 217, whether any mobile application is running on the device with any passenger or driver of the vehicle and if that vehicle has a virtual ticket.

Data can be feed into this system from the toll booth computer system when drivers are paying manually and other mechanisms such as Ezpass. As a result, enforcement officer will have data even for vehicles that didn't pay through this system. Also, the design can be enhanced to use OCR in backend to decrypt the photo of the vehicle number plate. To avoid expense of image file of the number plate to be uploaded, QR/barcode can be used where customers who enroll in the program get a free barcode for each vehicle they have registered.

Also, the location of the vehicle is verified by knowing the location of the Toll enforcement Officer's device—216 &

217. The Toll application can show to the officer the vehicles passing by him/her for the vehicles in which customers have paid toll using geo-location based toll enforcement app. If the user has not paid the Toll then officer can issue a Ticket using 214 module on the device. The data on the officer device is kept secure by encryption 213 and security 215 modules.

As shown in FIG. 6 flowchart, at strategic locations cameras can be mounted to take the license plate number photos. These photos will be OCRed into the License Plate number. This license plate number will be cross verified whether the Toll was paid and will be cross-linked with the photos from the toll booths where the manual payment using variety of means such a cash or credit card or transponder. Cross verifications will help to identify the vehicles which have not paid the toll.

One of the advantages of the system is that it can work with multiple toll booth collector authorities or companies as it can identify the toll road location due to location information provided by the smart phone or above mentioned geo-location enabled devices. Also, it can enforce different rules and toll tax rates based on the toll road, time of day, duration on the toll road, or the distance user travel on the toll road.

In brief, the present invention provide a most convenient way of tracking and monitoring of toll road by using the system on smart phone. The design doesn't require any new infrastructure to be created or marked on the road. This will save time and money both from user side and regulatory agency side.

Although the preferred embodiment as well as the preparation and use have been specifically described, it should be understood that variations in the preferred embodiment could be achieved by a person skilled in the art without departing from the spirit of the invention. The invention has been described with reference to specific embodiments which are merely illustrative and not intended to limit the scope of the invention as defined in the claims.

We claim:

1. A centralized toll tracking payment and monitoring system comprising:
   (a) a cloud toll system comprising of a repository of customer profiles, toll roads information, vehicle tracking information, customer payment profiles, toll vendors profiles and transactions wherein the cloud toll system:
      (i) determines if a vehicle, in which a customer is travelling on a plurality of roads, is using a toll road, managed by the cloud toll system, wherein the plurality of roads includes at least a toll road and a non-toll roads,
      (ii) tracks the vehicle by using geo-fencing techniques and by taking a plurality of discrete readings of geo locations of the vehicle, as the vehicle travels on the plurality of roads,
      (iii) calculates a toll fee for use of the toll road by the vehicle,
      (iv) provides one-time registration of the customer, who wants to use the toll road, before the customer uses the toll road,
      (v) registers each customer, an account from which the customer wants the toll fee to be debited,
      (vi) debits the toll fee from the customer's account after the customer exits the toll road;
   (b) customer Geo-location Enabled Mobile (GEM) devices carried by customers,
   wherein each customer geo-location enabled mobile device;
      (i) has been registered by the customer with the cloud toll system,
      (ii) comprises of at least a first processor, a first memory, a first display,
      (iii) runs a toll tracking application for interaction with the cloud toll system through a cellular network,
      (iv) obtains geo-location readings via both a Geo Position System (GPS) and a Location Based Service (LBS) provided by a cellular network,
      (v) uses the LBS to obtain geo-location readings if the GPS is not available on the customer GEM,
   (c) enforcement officers Geo-location Enabled Mobile (GEM) devices carried by enforcement officers wherein each enforcement officer geo-location enabled mobile device:
      (i) comprises of at least a second processor, a second memory and a second display,
      (ii) runs a to enforcement application used by an enforcement officer to interact with the cloud toll system through the cellular network,
      (iii) checks with the cloud toll system via the toll enforcement application, whether the vehicle travelling on the toll road is being tracked by the cloud toll system for a toll payment,
   whereby the cloud toll system determines if the vehicle is using the to road, by comparing a number of discrete geo-location readings of the vehicle travelling on the toll road with geo-locations of the toll road in the repository to overcome inherent inaccuracy in each LBS/GPS geo location reading,
   wherein the readings of the vehicle's geo-location are taken through the customer Geo-location Enabled Mobile (GEM) device travelling in the vehicle on, exiting, or approaching the toll road,
   wherein the toll tracking application for interaction with the cloud toil system is started before the customer approaches the toll road or the customer keeps the toll tracking application running in background in the customer Geo-location Enabled Mobile (GEM) device,
   wherein the cloud to system determines the number of discrete geo-location readings, taken on a stretch of the plurality of roads based upon length of the toll road and speed of the vehicle;
   wherein the toll tracking application detects a plurality of customer geo-location-enabled mobile devices running the toll tracking application being carded in the vehicle travelling on the to road managed by the cloud toll system; and
   in response to the detection, the cloud toll system notifies the plurality of customer geo-location-enabled mobile devices in the vehicle and disables toll payment options for each of the plurality of customer geo-location-enabled mobile in the vehicle except for one.

2. The centralized toll tracking payment and monitoring system of claim 1, further comprising identifying, by the enforcement application running on the enforcement officer Geo-location Enabled Mobile (GEM) device at an enforcement officer location, the vehicle being tracked by the cloud toll system for the toll payment.

3. The centralized toll tracking payment and monitoring system of claim 1, wherein the cloud toll system is connected with at least one external payment system and executes a debit transaction on the account owned by the customer for the toll fee after the vehicle exits from the toll road, and;

sends a debit transaction notification to the customer geo-location enabled mobile device carried by the customer after the cloud toll system validates travelling of the vehicle on the toll road.

4. The centralized toll tracking payment and monitoring system of claim 1 wherein the centralized toll tracking payment and monitoring system communicates exclusively via the cellular network with each of the cloud toll system, GPS, and Location Based Services (LBS) to track the vehicle; traveling on the toll road by taking a plurality of geo-location readings; and the cloud toil system automatically charges the customer for use of the toll road, without needing intervention from the customer.

5. The centralized toll tracking payment and monitoring system of claim 1 wherein the cloud toil system further comprises a rule engine that provides facility of configurable parameters to implement different toll rates and rules based on day and time of entry of the vehicle on the toll road, speed at which the vehicle travels on the toll road, and time spent by the vehicle on the toll road and toll plans.

6. The centralized toll tracking payment and monitoring system of claim 1, wherein the customer geo-location enabled mobile device is selected from at least one of a pager, a smart phone, a laptop, embedded geo-location device with GPS in the vehicle, or a palmtop device;

wherein the customer geo-location enabled mobile device is configured to communicate with the cloud toll system using the cellular network.

7. The centralized toll tracking payment and monitoring system of claim 1, wherein the toll tracking application, executing on the customer geo-location enabled mobile device carried by the customer, sends series of readings of discrete goo-locations of the vehicle on the toll road to the cloud toll system, and the customer geo-location enabled mobile device carried by the customer receives messages from the cloud toll system confirming usage of the toll road.

8. The centralized toll tracking payment and monitoring system of claim 1, wherein the cloud toll system identifies time of entry and exit by the vehicle on the toll road and implements a business rule of not charging the toll fee to the customer if the vehicle enters the toll road by mistake and returns back to the non-toll road prior to exceeding stipulated limits of time and distance on the toll road.

9. The centralized toll tracking payment and monitoring system of claim 1, wherein if the toll tracking application is active in background in the customer geo-location enabled mobile device carded by the customer, the cloud toll system is configured to automatically determine when the vehicle is on the toll road without requiring any manual input from the customer.

10. The centralized toll tracking payment and monitoring system of claim 1, wherein to rate of the toll road, can be modified by changing the toll road information in the cloud toll system and new toll roads can be added to the repository of the cloud toll system by adding the toll road information.

11. The centralized toll tracking payment and monitoring system of claim 1 wherein the toll tracking application dynamically adjusts the number of discrete geo-location readings from the customer geo-location enabled device carried by the customer based on distance of the vehicle from the toll road and speed of the vehicle moving on the toll road thereby optimizing amount of battery's energy used by the customer geo location enabled mobile device carded by the customer.

\* \* \* \* \*